United States Patent [19]

Fujimura

[11] Patent Number: 5,185,748
[45] Date of Patent: Feb. 9, 1993

[54] DUAL DATA CHECK APPARATUS

[75] Inventor: Masanori Fujimura, Tokyo, Japan

[73] Assignee: NEC Corporation, Tokyo, Japan

[21] Appl. No.: 522,009

[22] Filed: May 11, 1990

[30] Foreign Application Priority Data

May 12, 1989 [JP]  Japan .................................. 1-119536

[51] Int. Cl.$^5$ ............................................. G06F 11/16
[52] U.S. Cl. .................................. 371/68.1; 371/68.3; 371/10.1
[58] Field of Search ............... 371/68.1, 68.3, 67.1, 371/10.1, 10.2; 364/268.5

[56] References Cited

U.S. PATENT DOCUMENTS

| 3,544,777 | 12/1970 | Winkler | 371/68.1 |
| 3,978,327 | 8/1976 | Huber | 371/68.3 |
| 4,176,258 | 11/1979 | Jackson | 371/68.1 |
| 4,792,955 | 12/1988 | Johnson et al. | 371/68.1 |
| 4,843,608 | 6/1989 | Fu et al. | 371/68.1 |

OTHER PUBLICATIONS

IBM Tech. Disc. Bulletin, vol. 18, No. 4, pp. 1011-1013, Sep. 1975.

Primary Examiner—Robert W. Beausoliel
Assistant Examiner—Allen M. Lo
Attorney, Agent, or Firm—Sughrue, Mion, Zinn, Macpeak & Seas

[57] ABSTRACT

A dual data check apparatus is included in a system which includes at least one pair of electronic disk units which store identical data and an electronic disk controller connected to the two electronic disk units through an interface which can realize daisy-chain connections. One of the pair of electronic disk units includes an output unit for supplying to the interface data corresponding to a read command sent from the electronic disk controller. The other of the pair of electronic disk units includes a unit for fetching the data supplied from the output unit to the interface, comparing the fetched data with data read out in the other electronic disk unit in response to the read command, and signaling an error event to the electronic disk controller when a comparison result represents a noncoincidence.

8 Claims, 2 Drawing Sheets

DUAL DATA CHECK APPARATUS

BACKGROUND OF THE INVENTION

The present invention relates to utilization of an electronic disk subsystem and, more particularly, to a means for checking coincidence between data in two dual type electronic disk units.

In order to conventionally read out and collate dual data, these data are read out from two electronic disk units by different read sequences by software or a controller, and the readout data are compared with each other.

In such a conventional system, since the dual data are checked such that read commands are supplied to the two electronic disk units by different sequences by software or a controller, and the readout data are compared with each other, the software or controller is overloaded as compared with an operation for reading out single written data, thereby undesirably degrading system performance.

SUMMARY OF THE INVENTION

It is an object of the present invention to provide a dual data check apparatus which can accurately detect noncoincidence of readout data without degrading performance.

In order to achieve the above object of the present invention, there is provided a dual data check apparatus included in a system including at least one pair of electronic disk units which store identical data and an electronic disk controller connected to the two electronic disk units through an interface which can realize daisy-chain connections, wherein one of the pair of electronic disk units comprises output means for supplying to the interface data corresponding to a read command sent from the electronic disk controller, and the other of the pair of electronic disk units comprises means for fetching the data supplied from the output means to the interface, comparing the fetched data with data read out in the other electronic disk unit in response to the read command, and signaling an error event to the electronic disk controller when a comparison result represents a noncoincidence.

When a read command is output from an electronic disk controller to a dual type electronic disk unit, a main electronic disk unit outputs readout data onto an interface, and a sub electronic disk unit receives the readout data read out from the main electronic disk unit and appearing on the interface and compares the input readout data with readout data of its own. When a noncoincidence is detected as a result of comparison, the sub electronic disk unit supplies an error signal to the electronic disk controller.

DESCRIPTION OF THE PREFERRED EMBODIMENT

Figure 1:
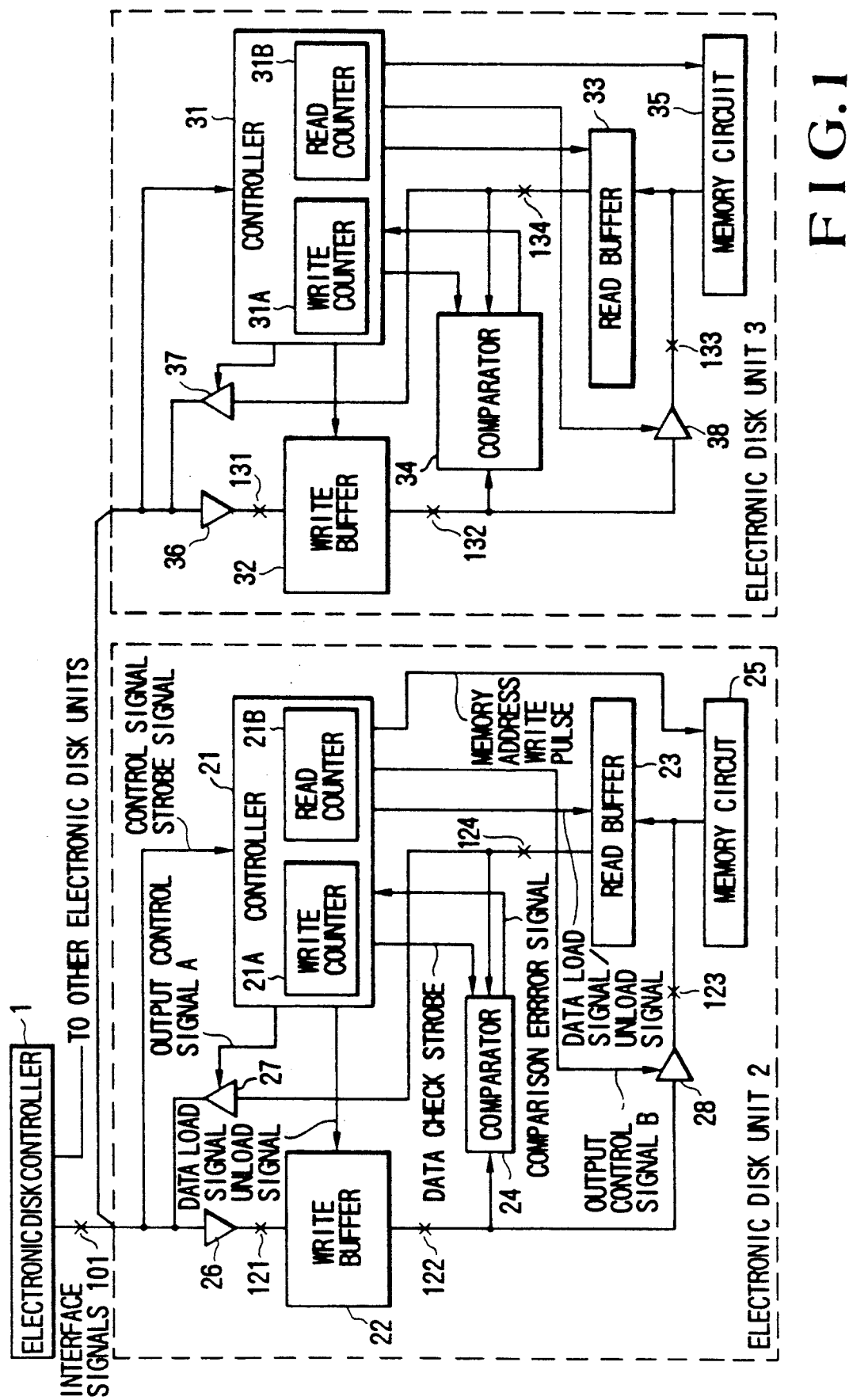
FIG. 1 is a block diagram showing an arrangement of an embodiment of the present invention.

A preferred embodiment of the present invention will be described with reference to FIGS. 1 and 2. This embodiment exemplifies an arrangement including a pair of dual type electronic disk units.

An dual data check apparatus comprises electronic disk units 2 and 3 and an electronic disk controller 1 for controlling the electronic disk units 2 and 3. The electronic disk units 2 and 3 are connected to the electronic disk controller 1 and interface signal lines 101 like a daisy chain. The electronic disk units 2 and 3 perform data read/write access in response to various commands output from the electronic disk controller 1. The electronic disk units 2 and 3 analyze commands sent from the electronic disk controller 1, control read/write access, and generate data comparison timing signals. The electronic disk units 2 and 3 respectively comprise: write counters 21A and 31A for managing data counts of write buffers 22 and 32; controllers 21 and 31 having read counters 21B and 31B for managing data counts of read buffers 23 and 33; write buffers 22 and 32 comprising FIFO buffers for temporarily storing write data sent from the electronic disk controller 1 and for temporarily storing data output from a main electronic disk unit on the interface signal lines 101 upon generation of a data read command from the electronic disk controller 1 when the corresponding electronic disk units are set as sub electronic disk units; read buffers 23 and 33 comprising FIFO buffers for temporarily storing data read out from memory circuits (RAM cards) 25 and 35 when a read command is output from the electronic disk controller 1; comparators 24 and 34 operated in response to the read command from the electronic disk controller 1 when the corresponding electronic disk units are set as sub electronic disk units, thereby comparing write buffer data 122 and 132 as outputs from the write buffers 22 and 32 with readout buffer data 124 and 134 as outputs from the read buffers 23 and 33; memory circuits 25 and 35 for storing data sent from the electronic disk controller 1; receivers 26 and 36 for receiving interface signals; drivers 27 and 37 for driving the interface signals; and gates 28 and 38 which are set in a high impedance state in the data read mode and which output write buffer data 122 and 132 to memory data 123 and 133 in the data write mode.

In this embodiment, at least one pair of electronic disk units 2 and 3 in which identical data are written and the electronic disk controller 1 connected to the electronic disk units 2 and 3 through the interface signal lines which realize daisy-chain connections are included in the dual data check apparatus. One of the electronic disk units 2 and 3 comprises the read buffer 23 serving as a means for outputting to the interface data corresponding to the read command from the electronic disk controller 1. The other of the electronic disk units 2 and 3 comprises the write buffer 22 and the comparator 24 which constitute a means for receiving data sent to the interface, comparing it with readout data of the other electronic disk unit in response to the read command, and signaling an error to the electronic disk controller 1 when a noncoincidence is established as a result of comparison.

Assume that the electronic disk unit 2 outputs readout data onto the interface and that the electronic disk unit 3 performs data comparison. The operating modes of the electronic disk units 2 and 3 are set by a switch. The electronic disk controller 1 sends commands to the electronic disk units 2 and 3 simultaneously or independently.

The interface signals 101 include bidirectional data shown in FIG. 1, a strobe signal (not shown), a command signal (not shown), an error alarm signal (not shown), and the like. The interface signals 101 also include control signals such as output control signals from the controllers 21 and 31 to the drivers 27 and 37, data load and unload signals from the controllers 21 and 31 to the write buffers 22 and 32, data load and unload signals from the controllers 21 and 31 to the read buffers 23 and 33, memory addresses and write pulses from the controllers 21 and 31 to the memory circuits 25 and 35, output control signals from the controllers 21 and 31 to the gates 28 and 38, data check strobe signals from the controllers 21 and 31 to the comparators 24 and 34, comparison error signals from the comparators 24 and 34 to the controllers 21 and 31, command and strobe signals from the interface signals 101 to the controllers 21 and 31, and error alarm and strobe signals from the controllers 21 and 31 to the interface signals 101.

An operation of this embodiment will be described below.

When the electronic disk controller 1 writes data in the electronic disk units 2 and 3, a write command is supplied to the controllers 21 and 31 through a command line of the interface signals 101. In this case, assume that the electronic disk unit 2 serves as a main disk unit and that the electronic disk unit 3 serves as a sub disk unit. This operation mode can be set by a switch arranged in each disk unit. The controller 21 in the main electronic disk unit 2 causes the driver 27 to inhibit generation of an output in response to an output control signal A and sequentially loads data sent together with the strobe signal of the interface signals 101 in the write buffer 22 in response to a data load signal. The controller 21 increments a write counter by one in response to the data load signal. The count of the write counter indicates the number of data in the write buffer 22. When the count of this write counter is not "Zero", the controller 21 outputs a write pulse to the memory circuit 25 to update its address. At the time, the controller 21 outputs an unload signal to the write buffer 22 and erases the data written in the memory circuit in the write buffer 22 and decrements the write counter by one. These operations are repeated to complete a write operation. At this time, the operation of the electronic disk unit 3 is the same as that of the electronic disk unit 2.

When the electronic disk controller 1 outputs a read command to the electronic disk units 2 and 3, this read command is sent to the controllers 21 and 31 by a command signal of the interface signals 101. The controller 21 in the electronic disk unit 2 outputs an output control signal to the gate 28 to disable an output from the gate 28. The controller 21 outputs a read address to the memory circuit 25. The controller 21 also outputs a data load signal to the read buffer 23 to load the data 123 read out from the memory circuit 25 in the read buffer 23. Since the data load signal is output from the controller 21 to the read buffer 23, the controller 21 increments the read counter by one. The count of the read counter indicates the number of data in the read buffer 23. When the count of this counter is not zero, the data output from the read buffer 23 together with the strobe signal is sent to the electronic disk controller 1 through the driver 27. The data sent from the read buffer 23 to the electronic disk controller 1 is abandoned in response to an unload signal output from the controller 21, and the read counter 21B is also decremented by one. These operations are repeated in the electronic disk unit 2.

The operation of the electronic disk unit 3 is the same as that of the electronic disk unit 2 in that an output from the gate 38 is disabled in response to an output control signal B. However, unlike the operation of the electronic disk unit 2, the electronic disk unit 3 outputs the output control signal A to the driver 37 to disable the output from the driver 37. As in the electronic disk unit 2, data is read out from the memory circuit 35 in the electronic disk unit 3 and is written in the read buffer 33. Data sent together with the strobe signal from the electronic disk unit 2 is loaded in the write buffer 32 as in the case of the write command. When the write counter 31A and the read counter 31B are both not zero, the controller 31 outputs a data check strobe signal to the comparator 34, and data from the write buffer 32 and the read buffer 33 are unloaded. This operation is shown in a timing chart in FIG. 2.

Figure 2:
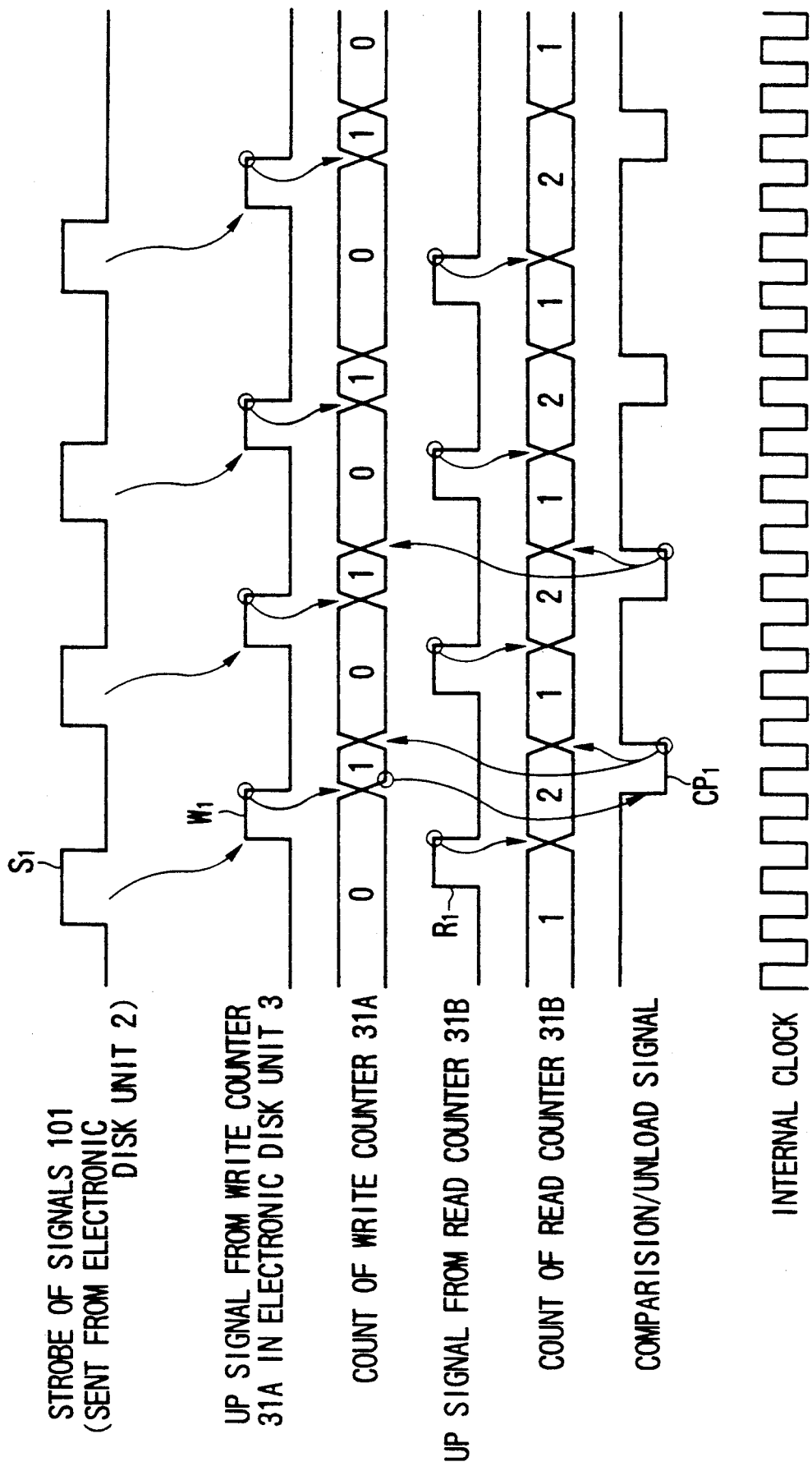
FIG. 2 is a timing chart for explaining an operation of the arrangement of the embodiment shown in FIG. 1.

Referring to FIG. 2, the controller 31 in the electronic disk unit 3 performs the following operation on the basis of the strobe signal of the signals 101 sent from the electronic disk unit 2. Data is written in the write buffer 32 in response to a strobe signal S1 to generate an UP signal W1 for the write counter 31A. At the trailing edge of the UP signal W1, data of "1" is written in the write counter 31A. At this time, data at the address of the memory circuit 35 which corresponds to the write data is loaded in the read buffer 33, and an UP signal R1 for the read counter 31B is also generated. Data of "1" is added to the data of "1" stored in the read counter 31B, so that the count of the read counter 31B is updated to "2". In this state, the comparator 34 compares the content of the write buffer 32 with the content of the read buffer 33 on the basis of a comparison signal CP1. When the contents are checked whether the contents coincide with each other, the contents of the write and read counters 31A and 31B are decremented by one each.

The comparison operations are continuously performed. When a noncoincidence is detected, the comparator 34 outputs a comparison error signal to the controller 31. The controller 31 signals that an error occurred in the electronic controller 1 by an error alarm signal of the interface signals 101.

As has been described according to the present invention, when data are read out from the dual type electronic disk units by the electronic disk controller, data is sent from one electronic disk unit to the other electronic disk controller, and the other electronic disk unit receives the readout data from one electronic disk unit and compares this input data with data read out from itself, thereby assuring reliability of dual operations and validity of readout data without degrading system performance.

What is claimed is:

1. An apparatus for checking data in dual storage devices, said apparatus comprising:
   a storage device controller for controlling first and second storage devices;
   an interface for coupling said controller to said first and second storage devices and for coupling said first storage device to said second storage device;
   said first storage device including at least
   a control unit for controlling reading, writing and data check operations within said first storage device;
   a write buffer for receiving data to be stored from said storage device controller;
   a memory device for storing data held in said write buffer of said first storage device during a data store operation; and a read buffer for receiving data to be retrieved from said memory device of said first storage device;

said second storage device including at least a control unit for controlling reading, writing and data check operations within said second storage device;

a write buffer for receiving the data to be stored from said storage device controller during the data store operation and for receiving the data read from said memory device of said first storage device, via said interface and said read buffer of said first storage device, during a data retrieve/check operation;

a memory device for storing data held in said write buffer of said second storage device during the data store operation;

a read buffer for receiving data from said memory device of said second storage device during the data retrieve/check operation; and a comparator circuit for comparing the data held in said write buffer of said second storage device with the data held in said read buffer of said second storage device during the data retrieve/check operation to produce an error signal if noncoincidence is determined.

2. An apparatus as recited in claim 1, wherein said first and second storage devices are electronic disk units.

3. An apparatus as recited in claim 2, wherein said first storage device further comprises a supply circuit for supplying the data received in said read buffer of said first storage device to said interface during the data retrieve/check mode.

4. A dual data system for checking data in a dual storage system, said dual data system comprising:

first and second storage devices each having a memory device;

a storage device controller for controlling first and second storage devices;

an interface for coupling the storage device controller to said first and second storage devices and for coupling together said first and second storage devices;

means for receiving and storing data sent via said interface;

means for storing the data received in memory devices in both said first and second storage devices during a data store operation;

means for receiving a read command from said storage device controller to begin a data retrieve/check operation;

means for retrieving data from said memory devices within the first and second storage devices during the data retrieve/check operation;

means for storing data retrieved from said memory devices of said first and second storage devices;

means for supplying the data retrieved from said memory device of the first storage device to said second storage device via said interface during the data retrieve/check operation; and means for comparing, at designated timings, the data sent and stored via said interface with the data retrieved and stored from said second storage device during the data retrieve/check operation to produce an error signal if noncoincidence is determined.

5. The dual data system according to claim 4, wherein said designated timings occur when said data supplied from said first storage device is stored in said means for receiving and storing data sent via said interface in said second storage device and said data retrieved from said memory device in said second storage device is stored in said means for storing data retrieved from said memory device.

6. A method for checking data in dual storage system, the dual storage system includes a storage device controller for controlling first and second storage devices, and an interface for coupling the storage device controller to the first and second storage devices and for coupling together the first and second storage devices, said method comprising:

(a) receiving and storing data sent via said interface;

(b) storing the data received in memory devices in both the first and second storage devices during a data store operation;

(c) receiving a read command from the storage device controller to begin a data retrieve/check operation;

(d) retrieving data from the memory devices within the first and second storage devices during the data retrieve/check operation;

(e) storing data retrieved from said memory devices of said first and second storage devices;

(f) supplying the data retrieved from the memory device of the first storage device to the second storage device via the interface during the data retrieve/check operation; and (g) comparing, at designated timings, the data sent and stored via said interface with the data retrieved and stored from the second storage device during the data retrieve/check operation to produce an error signal if noncoincidence is determined.

7. A method as recited in claim 6, wherein said first and second storage devices are electronic disk units.

8. The method according to claim 6, wherein said designated timings occur when said data supplied from said memory device of said first storage device is stored in said second storage device and when said data retrieved from said memory device of said second storage device is stored.

* * * * *